United States Patent [19]

Summers

[11] Patent Number: 4,995,531

[45] Date of Patent: Feb. 26, 1991

[54] RING DISPENSER

[75] Inventor: Roger L. Summers, Alliance, Ohio

[73] Assignee: Bridgestone/Firestone, Inc., Akron, Ohio

[21] Appl. No.: 366,044

[22] Filed: Jun. 14, 1989

[51] Int. Cl.$^5$ ............................................. B65G 33/02
[52] U.S. Cl. .................................. 221/75; 221/312 A; 198/467.1; 198/662
[58] Field of Search ......................... 221/75, 312 A; 198/465.4, 467.1, 661, 662, 676, 678; 414/910

[56] References Cited

U.S. PATENT DOCUMENTS

| | | | |
|---|---|---|---|
| 3,244,270 | 4/1966 | Wohlnick | 198/662 X |
| 3,248,005 | 4/1966 | Joschko | 221/75 X |
| 3,343,715 | 9/1967 | Edwards | 221/13 |
| 4,180,182 | 12/1979 | Fish et al. | 221/75 |
| 4,363,423 | 12/1982 | Larsen | 221/312 A X |
| 4,581,084 | 4/1986 | Mukas et al. | 156/131 |
| 4,683,020 | 7/1987 | Portalupi | 156/403 |

FOREIGN PATENT DOCUMENTS 0962137  9/1982  U.S.S.R.

*Primary Examiner*—F. J. Bartuska
*Attorney, Agent, or Firm*—R. Brietkrenz

[57] ABSTRACT

A ring dispenser comprising a rotating rod having an acme thread along one portion thereof and a helical coil spring at a dispensing end thereof feeds individual rings to a ring transfer device located at the dispensing end of the rod. The rod is rotated by a motor and the rings are automatically separated and directed to the end of the rod where a sensor detects the presence of the ring and stops the motor. When the ring transfer device is ready to pick up a ring, the motor starts again and a ring slides off a conical tip of the rod onto the transfer device by rotation of the rod. The rings have diameters greater than the separation between the individual threads of the rod so that the rings move on the crests of the threads and are out of engagement with the thread roots. The spacings between the convolutions of the coil spring are greater than the thickness of the rings so that the rings move on the rod surface as the rings approach the dispensing end of the rod.

12 Claims, 2 Drawing Sheets

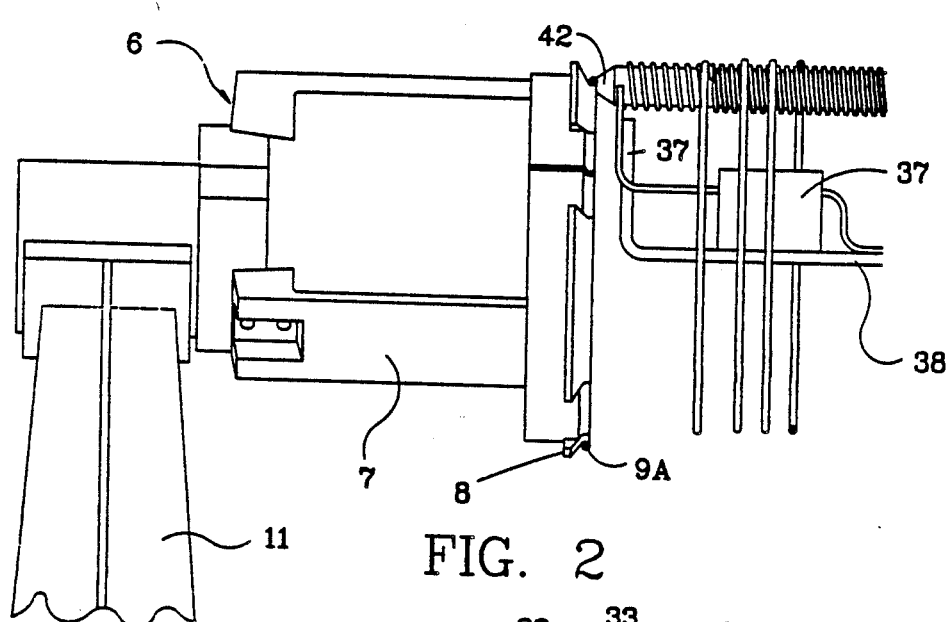
FIG. 2
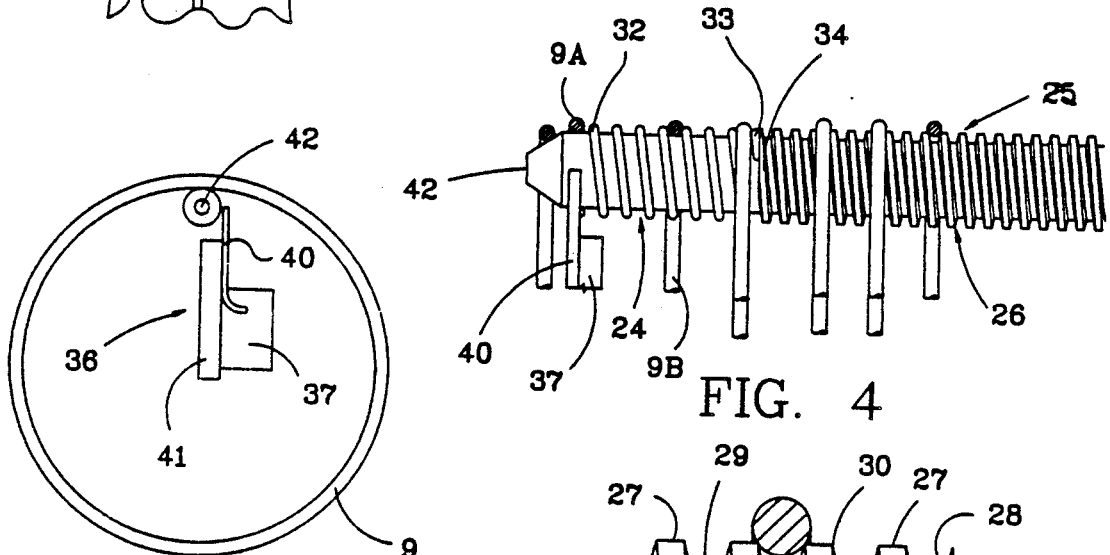
FIG. 3
FIG. 4
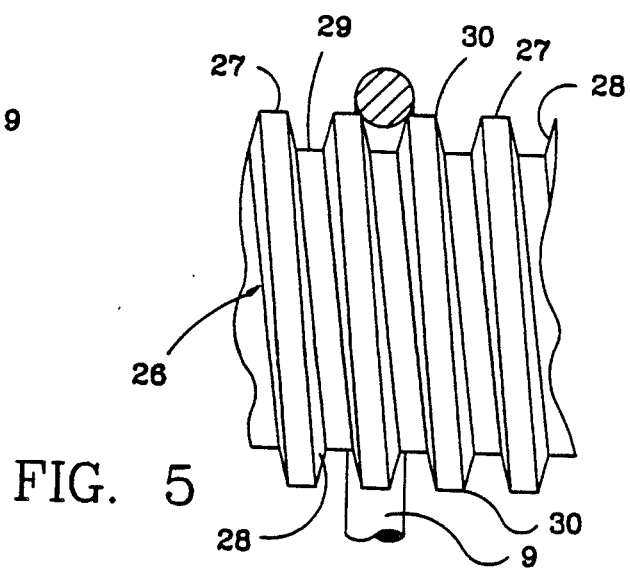
FIG. 5

RING DISPENSER

BACKGROUND OF THE INVENTION

1. Technical Field

The invention relates to ring dispensers and particularly to a dispenser which automatically separates and dispenses individual rings from a plurality of rings manually placed on the dispenser. More particularly, the invention relates to such a dispenser which individually delivers and supplies the rings to a bead loading machine in a tire or air spring manufacturing assembly line.

2. Background Information

In the manufacture of pneumatic tires, elastomeric air springs and similar products, an annular ring or bead formed of metal or synthetic material is applied to the sidewall area of the pneumatic tires or open ends of the elastomeric member of the air spring to provide reinforcement thereto and to provide a satisfactory seal with the adjacent rim or end caps.

Heretofore these rings were either manually placed by an operator of a buildup drum on the ends of elastomeric material strips, whether it be used for forming a pneumatic tire, air spring or similar product, or else automatically delivered to the build-up drum by slide and gate feed mechanisms.

Although these prior manual and automatic feed procedures are satisfactory for certain applications, it is desirable to provide a relatively simple mechanism which can be fully automated for individually feeding a ring to a ring receiving member, such as a bead loading, machine which can individually dispense the rings to the bead loading machine for subsequent automated programmed movement in a tire manufacturing or air spring manufacturing procedure.

Some examples of known prior mechanisms for transporting, feeding and/or supplying individual rings for various manufacturing and assembly operations are shown in the patents set forth below.

U.S. Pat. No. 3,343,715 discloses a dispensing device having a rotatable helical conveyor which rotates and dispenses individual articles stored on a rod. Individual shelves for retaining rolls or buns are positioned on the rod and as the rod is rotated under a driving force of a motor assembly, the individual buns are moved to an opening for dispensing by the helical screw.

U.S. Pat. No. 4,180,182 discloses a dispensing magazine device which includes a screw rotatable by a motor. Articles to be dispensed are located on the rotating screw and the screw rotates until a photosensitive device detects when the article is dropped and stops rotation of the screw so that only one article at a time will be dispensed. The magazine is loaded with hangable money packets and by tipping a pair of screws, the screw will rotate continuously until a packet is dropped with the rotation then being stopped after detection of the dispensed packet.

U.S. Pat. No. 4,581,084 discloses a method and apparatus for transferring bead cores wherein a feed unit includes a rotatable feed shaft with screw portions and a bead pressing assembly comprising another rotatable screw. In order to operate the bead transfer device, a feed drum is located with a set of bead cores around the bead drum. In this way, an integral tube of the bead cores on the feed drum is forced to move the drum segments toward a bead receiver unit forcing the bead cores to depart from the feed drum. Individual drum segments of the feed drum are caused to move radially away from a support shaft until the drum is expanded.

U.S. Pat. No. 4,683,020 discloses another apparatus for storing and filling tire beads wherein a conveyor assembly is mounted on a turret and has a number of continuous conveyors which are driven by a motor. The conveyors operate simultaneously to move beads towards the end of the conveyor in order to feed one bead at a time to a bead transfer device.

Russian Pat. No. 962,137 discloses a screw conveyor which is utilized for feeding machined components and includes a spiral which is fixed at one end to a drive shaft. The components are carried by the screw conveyor and are conducted to a discharge window.

Of the known prior art patents discussed above, U.S. Pat. No. 4,180,182 is believed to be the most pertinent, but it pertains to the dispensing of money packets which are moved along a threaded shaft on paper clips which ride in the valleys or on the roots of the rotating shaft which is not satisfactory for rings of a larger cross-sectional diameter of the type used for pneumatic tires and/or air springs.

Therefore, the need exists for an improved ring dispenser which individually feeds and dispenses rings from a plurality of rings onto a ring transfer machine preferably for subsequent use in a manufacturing process.

SUMMARY OF THE INVENTION

Objectives of the invention include providing an improved ring dispenser which is of a relatively simple structure, extremely durable and reliable in use; and in which individual rings can be transferred from a plurality of such rings previously placed on the machine and subsequently discharged individually onto a ring loading or pickup machine.

Another objective of the invention is to provide such a ring dispenser which can be fully automated in that the dispensing of the rings can be sequenced with the movement of the ring loading machine so that a ring can be automatically dispensed when the loading machine is in position for receiving the same for subsequent transfer by the machine to another work station.

A further objective of the invention is to provide such an improved ring dispenser in which the main element is a rotatable rod having a first portion formed with an acme thread; and in which the axial distance between adjacent thread crests is smaller than the cross-sectional diameter or thickness of the ring so that the ring rides or moves along and is supported by the thread crests free of contact with the root the threads until reaching an area adjacent the discharge end of the rod where the rings are moved between the individual convolutions of a helical coil spring mounted on the rod to provide a wider spacing of the rings for more controlled individual discharge of the rings onto a ring loading or receiving machine.

Still another objective of the invention is to provide such an improved ring dispenser in which a detecting mechanism, preferably a photosensitive device, is mounted adjacent the discharge end of the rotatable rod for sensing the arrival of a ring at the discharge end, and for stopping and starting the rod rotation so as to dispense the ring onto a loading machine after the machine has arrived adjacent the discharge end of the rod.

Another objective of the invention is to provide such a ring dispenser in which the tip of the thread rod is conically- shaped so that the ring slides down the tip of the rod and onto gripper jaws of a ring loading machine, thereby providing a smooth transfer of the ring from the rotating rod to the machine.

A still other objective of the invention is to provide such a ring dispenser which may be adjustably mounted for movement in a vertical and horizontal direction so that the dispenser can accommodate ring transfer machines of various sizes and configurations without effecting the operation of the dispenser; and in which most of the controls for the dispenser are incorporated into the dispenser machine itself eliminating additional external equipment and apparatus.

These objectives and advantages are obtained by the ring dispenser of the invention, the general nature of which may be stated as including a rod having first and second ends and a helical thread formed thereon for separating and moving a plurality of rings along said rod toward the second end; means for rotatably supporting the first end of the rod whereby the second end is located generally above a ring receiving member, a motor for rotating the rod, sensor means located adjacent the second end of the rod for detecting the arrival of a ring at said second end and for stopping and starting the rotation of the rod to dispense a ring from the second end onto the ring receiving member, and the rings each having a diameter so that the rings are supported between the crests of adjacent threads and are free of contact with the roots of the threads.

BRIEF DESCRIPTION OF THE DRAWINGS

A preferred embodiment of the invention, illustrative of the best modes in which applicant has contemplated applying the principles, is set forth in the following description and are shown in the drawings and is particularly and distinctly pointed out and set forth in the appended claims.

FIG. 2 is an enlarged fragmentary view showing a plurality of rings adjacent the end of the rotatable rod of the ring dispenser with one of the rings being discharged onto the gripper jaws of the ring loading machine;

FIG. 3 is an enlarged end elevational view looking in the direction of arrows 3—3, FIG. 1;

FIG. 4 is a further enlarged fragmentary view of the discharge end of the rod and sensing device with a plurality of the rings being mounted thereon; and FIG. 5 is a greatly enlarged fragmentary sectional view of a portion of the threaded rod showing one of the rings being carried by the crest of the threads.

Similar numerals refer to similar parts throughout the drawings.

DESCRIPTION OF THE PREFERRED EMBODIMENT

Figure 1:
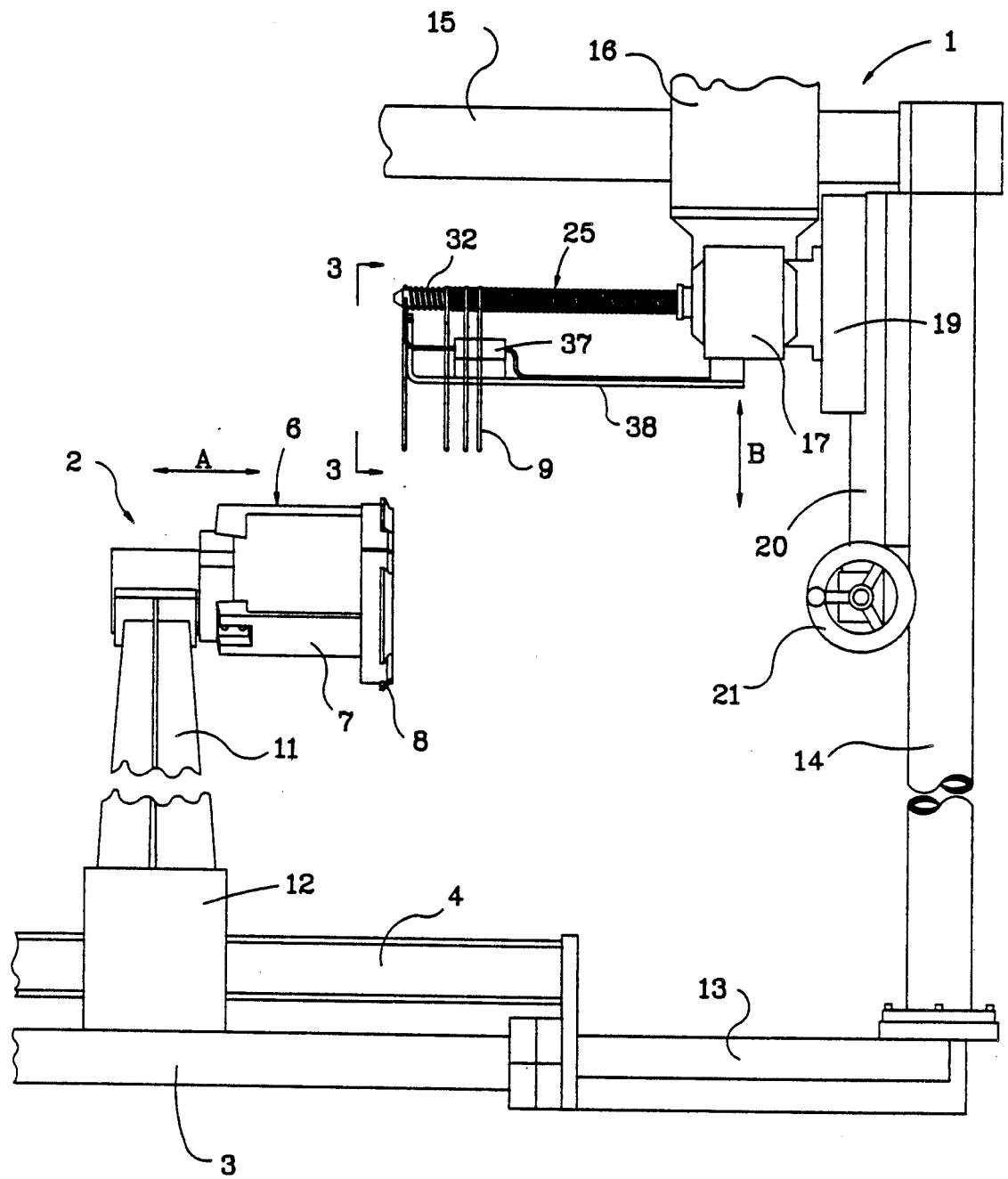
FIG. 1 is a generally diagrammatic fragmentary side elevational view showing the improved ring dispenser of the invention in combination with a ring loading machine.

Referring to FIG. 1, the improved ring dispenser is indicated generally at 1, and is shown in combination with a usual ring or bead loading machine indicated generally at 2. Ring loading machine 2 is of a usual construction well known in the art, the details of which form no particular part of the invention. Loading machine 2 consists of a base 3 and a slide rail 4 for linear movement of a ring receiving mandrel 6 therealong. Mandrel 6 includes a plurality of sections 7 which are moveable radially inwardly and outwardly by an appropriate mechanism so that the gripping jaws 8 thereof may grip a ring 9 thereon for subsequent movement to another work station. Mandrel 6 is mounted on a pedestal 11 which includes a base 12 slideably mounted on slide rail 4 for movement of mandrel 6 in the direction of arrow A (FIG. 1).

Ring dispenser 1 includes a base 13 and a vertical pedestal 14 and an upper support beam 15. A motor 16 is mounted on and coupled in a usual manner with a gear reducer 17. Motor 16 and gear reducer 17 are mounted for vertical adjustable movement in the direction of arrow B by a slide plate 19 which is mounted by a rack and pinion arrangement or other slide mechanism, on a slide plate 20. Plate 20 is mounted on pedestal 14 and moveable therealong by a manually actuated hand wheel 21 or other control mechanism. Thus motor 16 and reducer 17 can be vertically adjusted to accommodate various types and sizes of ring loading machines 2 by a simple adjustment of handwheel 21.

In accordance with the main feature of the invention, a rod indicated generally at 25, is rotatably mounted at its inner end to reducer 17 so as to be rotatable thereby. Rod 25 extends in a generally horizontal direction outwardly from gear reducer 17 as shown particularly in FIG. 1. Rod 25 is formed with a length of helical thread 26 (FIG. 4) having a helical acme thread formed thereon, and an outer preferably smooth cylindrical section 24.

Referring to FIG. 5, thread 26 consists of a plurality of flat crests 27, tapered sides 28, and root surfaces 29. Crests 27 meet with tapered sides 28 at relatively sharp corners 30. The particular pitch of the helical thread 26 will vary depending upon the cross-sectional diameter of the rings 9 intended for use with ring dispenser 1. Rings 9 are circular in cross-section as shown particularly in FIGS. 4 and 5.

A helical coil spring 32 is mounted on outer end 24 of rod 25 and preferably has a tight frictional fit therewith so as to rotate with the rod. The end of the innermost convolution (FIG. 4) of spring 32 abuts outermost thread 34 of acme thread section 26 to provide a relatively smooth transition between acme thread section 26 and helical spring 32.

In further accordance with another feature of the invention, a sensing device indicated generally at 36 (FIGS. 1–3), is mounted adjacent the discharge end of rod 25. Device 36 includes an emitter/detector 37 which is mounted on a horizontal bracket 38 preferably mounted in a cantilever manner on gear reducer 17 and extending horizontally along with and parallel beneath rod 25. A fiber optic 40 extends along a bent upwardly extending bracket end 41 and terminates adjacent the conical shaped tip 42 of rod 25 so as to detect the arrival of a ring 9 at the discharge end of the rod as shown in FIG. 4.

In accordance with the invention, the cross-sectional diameter of ring 9 (FIG. 4) is greater than the axial distance between adjacent corners 30 of thread crests 27 so that the rings are carried along acme thread section 26 on the corners or crests of the threads free of contact with root surfaces 29. This enables the rings to extend from rod 25 in a direction generally perpendicular to the longitudinal axis of the rod. This relationship has been found to provide better separation for the rings as the rings move along the rod than would occur if the rings were resting in the grooves of the threads on the root surfaces.

In accordance with another feature of the invention, the axial distance or spacing between the individual convolutions of coil spring 32 as shown in FIG. 4, is greater than the diameter or thickness of rings 9 so that the rings drop into the grooves or spaces between the spring convolutions onto the smooth surface of rod end 24. This spacing provides better separation between the individual adjacent rings for subsequent detection and discharge upon reaching the discharge end of rod 25.

In the preferred embodiment, rings 9 will have a cross-sectional diameter of 0.156 inches and the diameter of rod 25 is 0.75 inches, that is, the diameter between the thread roots or surface 29, and the diameter of crests 27 will be approximately 1.0 inches. The pitch of thread 26 will be 0.2 inches, thereby when used with the ring size set forth above will provide the relationship between the ring and thread as shown in FIG. 5. Helical coil spring 32 preferably has a circular cross-sectional diameter of 0.105 inches and a coil pitch of 0.31 inches which enables rings 9 to ride on the intervening rod surface between the individual convolutions of the coil spring. It is readily understood that these dimensions may vary for different applications but the ratios and relationships therebetween is important as set forth above.

In operation, a plurality of rings 9 are placed manually in a bunch on the inner portion of rod 25 generally adjacent gear reducer 17. Rotation of shaft 25 will individually separate the rings and move the rings longitudinally or axially along the rod as it is rotated by motor 16 and gear reducer 17 until the lead ring indicated at 9A in FIG. 4, reaches conical tip 42 where it is sensed by fiber optic and sensing device 36 to stop the rotation of rod 25. The position of ring loading machine 2 is sensed by various limit switches and other sensing devices (not shown) so that the control circuitry for motor 16 will be actuated when mandrel 6 is in proper position with respect to conical tip 42 of rod 25 as shown in FIG. 2 for receiving ring 9A. Upon this position being achieved, the motor is actuated, causing rod to rotate one revolution which will advance ring 9A sufficiently forwardly so that it will slide down the inclined surface of conical tip 42 and onto gripping jaws 8 of mandrel 6 whereupon the mandrel sections 7 will expand outwardly securely gripping ring 9A thereon for subsequent transfer to another work station.

Rod 25 will continue to rotate until the next ring indicated at 9B (FIG. 4) has reached sensing device 36 which will then stop rotation of rod 25 until the return of mandrel 6 to the receiving position as shown in FIG. 2.

It has been found that a rotational speed of 14 RPM for rod 25 provides a satisfactory movement of the rings along the rod, and that the sensing device 36 being an infrared sensor, also preforms satisfactorily for most applications. However, additional rotational speeds can be used depending upon the particular pitch and thread size of rod 25 and the spacing between the convolutions of coil spring 32, which are also in relationship to the cross sectional thickness of the particular rings 9 being conveyed thereby. Also the speed of the machine may be matched to the particular speed of ring loading machine 2 which will also depend upon the particular manufacturing and assembly operation with which ring dispenser 1 and machine 2 is being utilized.

Thus, the improved ring dispenser provides a dispensing device which provides ease of loading of the rings by manual placement of a plurality thereof onto rod 25; which provides a uniform feed rate of the rings along the threaded rod and onto a loading machine; which separates the rings automatically after loading; and which eliminates or materially reduces machine stoppage due to ring feed jam-ups as occurred with prior types of ring dispensers.

Also, the speed of the rod and lead angle of the thread and size of thread in relationship to the thickness of the ring will be varied to match one another and to achieve the desired feed rate, with one of the important features being the movement of the ring along threaded rod section 26 by resting upon corners 30 or crests 27 of the individual threads in contrast to being carried along the thread roots as in prior art threaded rod dispensing devices.

Accordingly, the improved ring dispenser is simplified, provides an effective, safe, inexpensive, and efficient device which achieves all the enumerated objective, provides for eliminating difficulties encountered with prior devices, and solves problems and obtains new results in the art.

In the foregoing description, certain terms have been used for brevity, clearness and understanding; but no unnecessary limitation are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved ring dispenser is constructed and used, the characteristics of the construction, and the advantageous, new and useful results obtained; the new and useful structures, devices, elements, arrangements, parts and combinations, are set forth in the appended claims.

I claim:

1. A ring dispenser including:
   (a) a rod having first and second ends and a helical thread formed thereon for separating and moving a plurality of rings along said rod toward the second end;
   (b) means for rotatably supporting the first end of the rod whereby the second end is located generally above a ring receiving member;
   (c) a motor for rotating the rod;
   (d) sensor means located adjacent the second end of the rod for detecting the arrival of a ring at said second end and for stopping and starting the rotation of the rod to dispense a ring from the second end onto the ring receiving member;
   (e) the rings each having a cross-sectional diameter so that the rings are supported between the crests of adjacent threads of the helical thread and are free of contact with the roots of the threads;
   (f) a helical coil spring mounted on the rod and located between the second end of the rod and said helical threads; and
   (g) the rings having a cross-sectional diameter less than the spacings between the individual convolutions of the coil spring so as to lie on the rod between the convolutions of the spring as the rings move along said rod toward the second end.

2. The ring dispenser defined in claim 1 in which the sensor means is a photosensitive device.

3. The ring dispenser defined in claim 2 in which the photosensitive device is an infrared sensor.

4. The ring dispenser defined in claim 1 in which the second end of the rod has a conical tip so that each of the rings upon leaving an outermost thread of the rod slides along said tip for dispensing to the ring receiving member.

5. The ring dispenser defined in claim 1 in which the ring receiving member is an expandable mandrel.

6. The ring dispenser defined in claim 1 in which the rod is rotated at approximately 14 RPM by the motor.

7. The ring dispenser defined in claim 1 in which the rings are circular in cross section.

8. The ring dispenser defined in claim 1 in which the ring receiving member is movably mounted on a track for linear parallel movement with respect to the second end and the longitudinal axis of the rod.

9. The ring dispenser defined in claim 1 in which the helical thread of the rod is an acme thread.

10. The ring dispenser defined in claim 9 in which the thread has a pitch of approximately 0.20 inches and the ring has a circular cross-sectional diameter of approximately 0.156 inches.

11. The ring dispenser defined in claim 10 in which the acme thread has roots and crests; and in which the rod diameter between the roots of the thread is approximately 0.75 inches and the diameter of the thread crests is approximately 1.0 inches.

12. The ring dispenser defined in claim 1 in which the coil spring has a circular cross-section with a diameter of approximately 0.105 inches and a pitch of approximately 0.31 inches; and in which the ring has a circular cross-sectional diameter of approximately 0.156 inches.

* * * * *